(12) United States Patent
Grot et al.

(10) Patent No.: US 7,065,277 B2
(45) Date of Patent: Jun. 20, 2006

(54) OPTICAL ALIGNMENT OF OPTICAL WAVEGUIDES

(76) Inventors: Annette C. Grot, 10535 Meteor Pl., Cupertino, CA (US) 95014; Kenneth R. Wildnauer, 2478 Murdock Dr., Santa Rosa, CA (US) 95404-2207

( * ) Notice: Subject to any disclaimer, the term of this patent is extended or adjusted under 35 U.S.C. 154(b) by 186 days.

(21) Appl. No.: 10/628,171

(22) Filed: Jul. 28, 2003

(65) Prior Publication Data

US 2005/0025428 A1    Feb. 3, 2005

(51) Int. Cl.
*G02B 6/26* (2006.01)
(52) U.S. Cl. .............................. 385/50; 385/15; 385/39
(58) Field of Classification Search .................. 385/15, 385/39, 50
See application file for complete search history.

(56) References Cited

U.S. PATENT DOCUMENTS 3,900,245 A * 8/1975 Dyott et al. ................. 385/51
5,854,868 A * 12/1998 Yoshimura et al. .......... 385/50
2003/0223692 A1* 12/2003 Ikarashi et al. .............. 385/38

* cited by examiner

Primary Examiner—Jennifer Doan

(57) ABSTRACT

The optical waveguide device comprises two optical waveguides and an optical coupler extending between the adjacent ends of the waveguides. The optical coupler comprises material that includes a waveguide region. The waveguide region has a shape defined by overlapping cones of light emitted from the ends of the optical waveguides. In the optical alignment method, first and second optical waveguides are axially aligned, leaving a gap between their adjacent ends. The gap is filled with material having a refractive index capable of being increased by exposing the material to light. The material is exposed to conical beams of light emitted from the adjacent ends of the waveguides. Exposing the material increases the refractive index of the material in a region in which the beams of light overlap. The resulting refractive index difference prevents light from diverging as it propagating across the gap between adjacent ends of the optical waveguides.

15 Claims, 2 Drawing Sheets

OPTICAL ALIGNMENT OF OPTICAL WAVEGUIDES

TECHNICAL FIELD OF THE INVENTION

The present invention relates to optical waveguides and, more particularly, to a method for aligning two optical waveguides, such as two optical fibers, for example, without the need for using precision-made mechanical components or active alignment techniques.

BACKGROUND OF THE INVENTION

When light propagates out of the end of an optical waveguide (WG), such as an optical fiber, into air, the light diverges because there is no guiding mechanism in the air. The WG core is surrounded by material that has a refractive index that is slightly lower than that of the WG core, which prevents light from diverging as it propagates along the WG core. Generally, almost all optical WGs have these refractive index characteristics. One exception is the photonic crystal waveguide or fiber in which the guiding mechanism is based on diffraction.

When optical waveguides are coupled together, the cores of the WGs should be aligned with each other in such a way that substantially all of the light is coupled from the core of one WG into the core of the other. Otherwise, too much light will be lost at the coupling location of the WGs and signal integrity will degrade.

Various precision-made mechanical components are typically used to couple optical fibers together to ensure that no light is lost at the coupling location. The ends of fibers have ferrules on them that are polished on their end-faces so that the end-faces of the ferrules are flush when the fibers are coupled together. The end of each fiber having the ferrule thereon is secured within a plug that holds the ferrule in a fixed position and provides strain relief for the fiber. The plug is configured to snap securely into one side of a two-sided receptacle. When two plugs are snapped into opposite sides of the receptacle, the polished end-faces of the ferrules are flush with each so that light passes from the end of one of the optical fibers into the end of the other optical fiber without having an opportunity to diverge.

With this type of precision-made plug, all of the components are precisely fashioned to achieve precise optical coupling. The inside of the plug is precisely molded with very small keying and gripping features that work together to hold the end of the fiber in a fixed position and provide strain relief. Likewise, the outside of the plug and the inside of the mating receptacle are precisely molded with keying and gripping features to hold the plugs in fixed positions in the receptacles so that the polished end-faces of the ferrules are immediately adjacent one another and precisely aligned.

Active alignment techniques are also used to align ends of optical fibers. Active alignment techniques generally include coupling first and second optical fibers together with a coupling mechanism, projecting light down the first fiber into a proximal end of the second fiber, analyzing the light that propagates out of the distal end of the second fiber to determine alignment, and adjusting the coupling mechanism until a determination is made that proper alignment has been achieved. Not only is alignment needed to prevent optical attenuation, in some cases it is needed to provide polarization continuity as the light propagates from one fiber into the other.

It would be desirable to provide an alignment technique that would enable optical WGs to be coupled together and optically aligned without the need for using intricate mechanical alignment devices or complicated active alignment techniques.

SUMMARY OF THE INVENTION

The present invention provides an optical waveguide (WG) device and a method for aligning optical waveguides (WGs). The optical WG device comprises two optical WGs and an optical coupler that extends between the adjacent ends of the WGs. The optical coupler comprises material that includes a waveguide region. The waveguide region has a shape defined in the material by overlapping cones of light emitted from the ends of the optical waveguides. In an embodiment, the material has a refractive index that is capable of being increased by exposing the material to light of a particular wavelength or wavelength band. Such exposure to light causes the material to undergo cross linking, which causes the material to solidify and increases its refractive index. The refractive index of the material in the waveguide region is higher than the refractive index of any medium surrounding it (e.g., a solid, such as a less densely cross-linked region of the material, a gas, such as air, a liquid, etc.). The refractive index difference prevents light from diverging as the light propagates through the optical coupler between adjacent ends of the WGs.

The method of the present invention is performed by providing a first optical waveguide and a second optical waveguide. The first and second optical waveguides are axially aligned, leaving a gap between their adjacent ends. The gap is filled with material having a refractive index capable of being increased by exposing the material to light. The material is exposed to conical beams of light emitted from the adjacent ends of the waveguides. Exposing the material to such conical beams of light increases the refractive index of the material in a region in which the beams of light overlap.

The optical waveguide device couples light propagating through one of the WGs from the core region of that WG into the core region of the other WG. The coupling is greater than that between the juxtaposed waveguide ends due to the increased refractive index of the waveguide region of the optical coupler.

Other features and advantages of the present invention will become apparent from the following description, drawings and claims.

DETAILED DESCRIPTION OF THE PREFERRED EMBODIMENT

Figure 1:
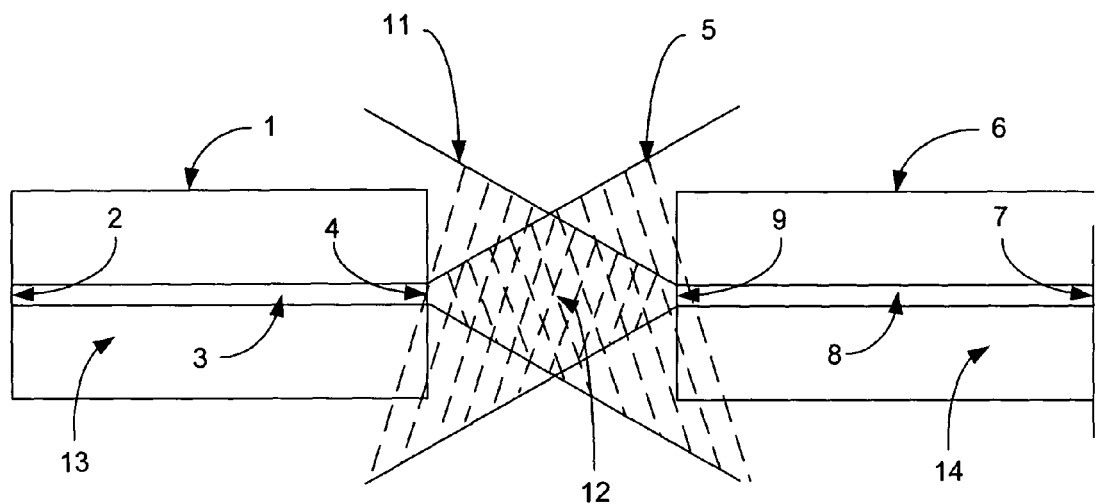
FIG. 1 is a plan view of two optical WGs positioned end-to-end, and illustrates the manner in which light diverges as it passes out of the ends of the optical WG cores.

FIG. 1 is a plan view of two optical WGs positioned end-to-end and illustrates the manner in which light diverges as it passes out of the ends of the cores of the WGs. For example purposes, the WGs will be described as being optical fibers. Optical fiber 1 has a first end 2 that receives light from a light source such as a laser (not shown). The fiber 1 has an optical WG core 3 through which the received light propagates. In an optical fiber, optical WG core 3 is commonly referred to as the fiber core. The region in the fiber 1 that surrounds the core 3, commonly referred to as the cladding, is doped to provide the cladding with desired refractive index characteristics. The cladding of fiber 1 is represented by reference numeral 13. The light that propagates through the core 3 passes out of the end 4 of the fiber 1 opposite the end 2 of the fiber 1. As the light passes out of the end 4, it diverges in a cone-shaped divergence pattern, which is represented by the numeral 5 in FIG. 1.

The reason that the light diverges is that, when the light exits the core 3, the refractive index gradient created by the difference between the refractive index of the core 3 and the refractive index of the cladding 13 no longer exists. When light propagates through a substance (e.g., a solid, a liquid or a gas) that has a uniform index of refraction, the light will diverge. The refractive index of the core 3 normally is not uniform. Rather, the refractive index is at a maximum at the center of the core 3 and gradually decreases radially extending out from the center of the core 3 toward its outer edge. This index gradient causes the light to remain in the core 3 as it propagates through the fiber 1.

Like the fiber 1, the fiber 6 has a first end 7, a core 8 and a second end 9. Light received at the first end 7, diverges when it exits from the second end 9 with the generally cone-shaped divergence pattern 11. The cone-shaped divergence patterns 5 and 11 overlap in the region represented by reference numeral 12. The fibers 1 and 6 are shown as being axially aligned. Typically, very precise alignment devices are needed to produce such precise alignment, such as precision made plugs and receptacles. Also, although such devices generally enable the fibers to be axially aligned, variations in fiber eccentricity can prevent the cores of the fibers from being aligned even when the fibers are aligned. As described below, the present invention enables the cores of two optical fibers to be aligned, regardless of whether or not the fibers themselves are precisely aligned. It should be noted that the present invention is equally applicable to all types of optical waveguides, including, but not limited to, optical fibers. However, in order to demonstrate an example of the method and apparatus of the present invention, the present invention will be described with reference to its applicability to optical fibers.

Figure 2:
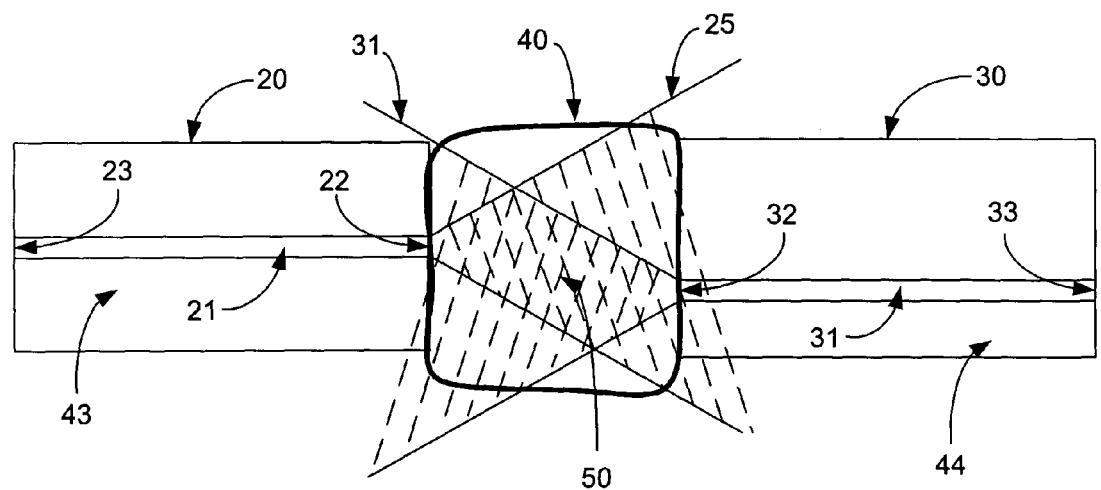
FIG. 2 is a plan view of an optical waveguide device in accordance with the invention.

FIG. 2 shows two optical fibers 20 and 30 that are in coarse alignment with each other. The cores 21 and 31 of the fibers 20 and 30, respectively, are shown as being slightly axially offset in order to demonstrate how the cores 21 and 31 can be optically aligned despite a variation in the eccentricity of the cores 21 and 31 of the fibers 20 and 30, respectively. In accordance with the present invention, a material 40 that is capable of undergoing cross-linking when exposed to light is placed between and in contact with first ends 22 and 32 of the fibers 20 and 30, as shown in FIG. 2. Light is then projected into second ends 23 and 33 of the fibers 20 and 30. In the region 50 where the light from each of the fibers 20 and 30 overlaps, the material 40 will be exposed to light of high intensity, which will cause the material to undergo cross-linking. The material 40 can be any type of material that undergoes cross-linking when exposed to light, such as a photopolymer material, for example.

As a result of the exposure, the material 40 in the region 50 undergoes cross-linking. Cross-linking causes the material to solidify and its refractive index to increase, whereas the remainder of the material 40 outside of region 50 will remain liquid and with a relatively low refractive index. This difference between the refractive indices of the region 50 of the material 40 and the remainder of the material 40 will prevent the light from diverging when it propagates through the material 40 and between the ends 22 and 32. The result is that, during operation, light will be coupled between the cores 21 and 31 of the fibers 20 and 30 by the region 50 of the material 40. The region 50 of the material 40 that has been exposed to the high-intensity light can be regarded as the waveguide region of an optical coupler that couples light between the cores 21 and 31.

Figure 3:
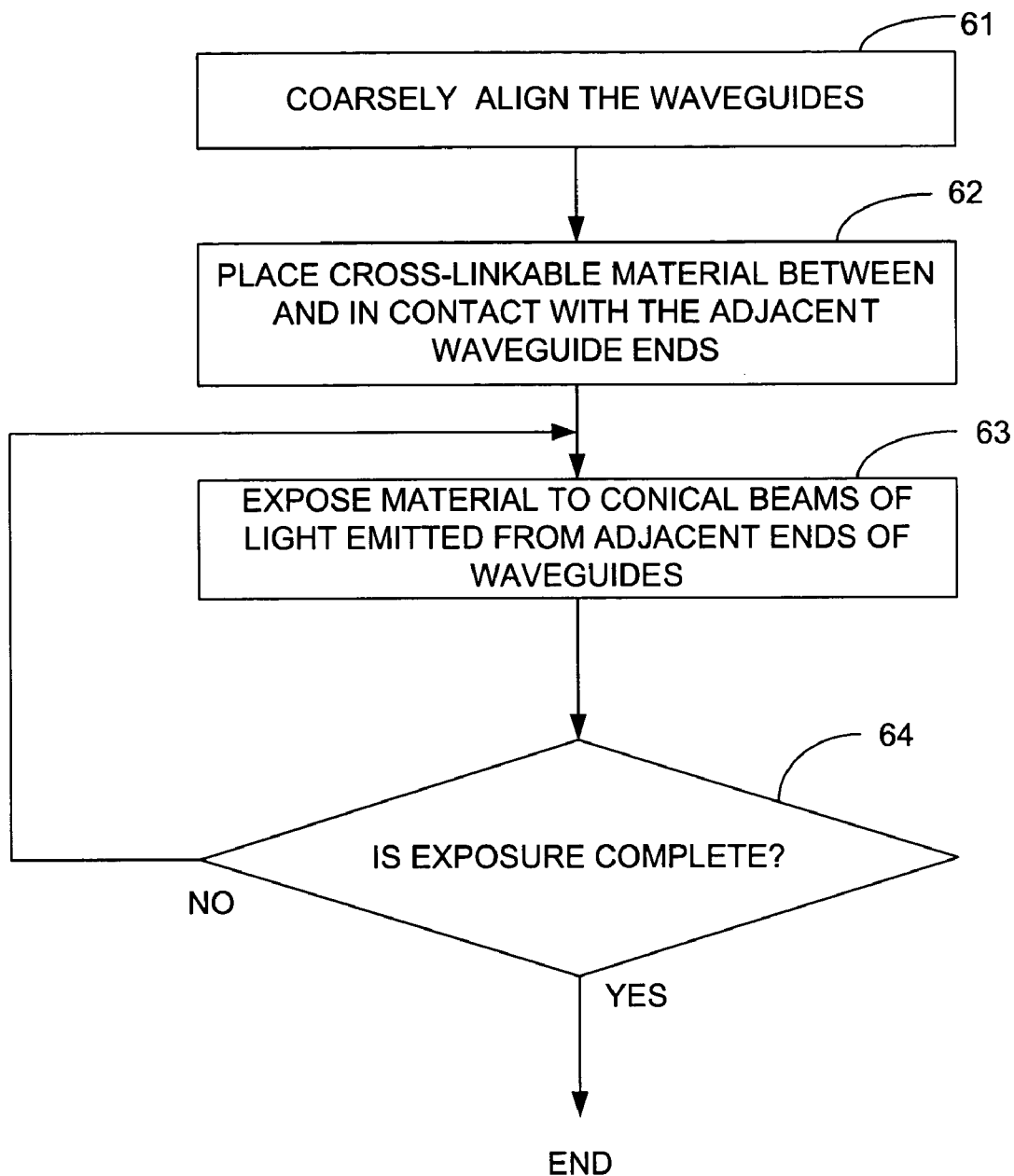
FIG. 3 is a flow chart of a method of the present invention in accordance with a first exemplary embodiment.

FIG. 3 is a flow chart of the optical alignment method of the present invention in accordance with an exemplary embodiment. In block 61, the ends 22 and 32 of the fibers 20 and 30, respectively, are placed adjacent each other to at least coarsely align the fibers 20 and 30. The alignment does not need to be precise and can be done by hand or by using an alignment tool or apparatus, such as a surface having a groove formed therein that conforms to the external shape of an optical fiber. If the fibers 20 and 30 are from the same manufactured batch, then coarse, axial alignment of the fibers 20 and 30 generally will result in coarse, axial alignment of the cores 21 and 31. It is known in the art how to axially align fibers, whether they come from the same batch or not.

Once the ends 22 and 32 have been placed in position, in block 62, cross-linkable material 40 is disposed between and in contact with the ends 22 and 32. In an embodiment in which the material 40 is a photopolymer, the material 40 will be in liquid form and can be poured into the gap between the ends 22 and 32. In block 63, the material 40 is exposed to conical beams of light emitted into the material from the adjacent ends of the fibers 20 and 30. The distal ends 23 and 32 of the fibers 20 and 30, respectively, are illuminated and the light propagates through the fibers and is emitted in conical beams from the ends 22 and 32, respectively. In block 64, a determination is made as to whether the material 40 has been sufficiently exposed to obtain the desired degree of cross-linking. The exposure represented by block 63 stops when it is determined that the material 40 has been sufficiently exposed. Otherwise, the exposure continues. Once the exposure is complete, the fibers are optically aligned by the formation of the waveguide region 50.

It is desirable that the portion of the material 40 in the region 50 be exposed such that it undergoes complete cross-linking. With regard to the remainder of the material 40 outside region 50, in one embodiment, the remainder of the material 40 is removed by, for example, rinsing away the unexposed material. In another embodiment, the remainder of the material 40 outside region 50 is exposed to an extent that causes it to solidify and that affixes material 40 to the ends 22 and 32 of the fibers 20 and 30. This additional exposure of material 40 can be done before or after exposure to the overlapping conical beams of light using light directed onto material 40 from outside. The additional exposure surrounds waveguide region 50 with solid material 40 having a lower refractive index than the material 40 in region 50. Only in the region 50 where the conical light beams emitted from the ends 22 and 32 of the fibers 20 and 30 overlap does the material 40 undergo full cross-linking. The resulting refractive index gradient between the region 50 and the remainder of material 40 prevents light from diverging out of the region 50.

In accordance with a first embodiment, the material 40 undergoes cross-linking by one-photon absorption. Cross-linkable polymers undergo cross-linking when they are exposed to particular wavelengths of light. Techniques for selecting the proper material and source of light are known in the art. Generally, the manufacturers of cross-linkable provide information on the wavelengths that cause the polymers to undergo cross-linking. A number of different cross-linkable polymers are suitable for use with the present invention. In order for a polymer to be suitable for this purpose, it must be one that will undergo cross-linking when exposed to light and one for which an initiator exists that will cause the polymer to undergo cross-linking when exposed to light. Many polymers exist that meet these conditions. Examples of such polymers include PMMA, epoxy and polyimide.

Many ultraviolet (UV)-light initiators are suitable for use as initiators with these polymers including, for example, Ciba® IGRACURE® 184 and 819 photoinitiators sold by Ciba Specialty Chemicals Additives of Tarrytown, N.Y. Examples of commercially-available pre-mixed polymers and UV initiators are Type J91 optical cement sold by Summers Optical of Fort Washington, Pa. and Type NOA 61 optical adhesive sold by Norland Products, Inc. of Cranbury N.J.

In addition to physically hardening the polymer, cross-linking also causes the refractive index of the polymer to increase, usually because the polymer shrinks and becomes more dense as a result of cross-linking. The material selected as material 40 should be of the type that exposure to sufficient light intensity will make the refractive index of the region 50 that is exposed to the light is higher than the refractive index of the remainder of material 40. The remainder of material 40 may be material that is unexposed, or that is less exposed, than material in region 50. The remainder of material 40 may be solid or liquid. Alternatively, waveguide region 50 may be surrounded by another solid, liquid or gaseous medium, such as air. For example, in an embodiment in which all the remainder of the material 40 outside region 50 remains unexposed and is removed after the region 50 has been exposed, the region 50 of the material 40 will be surrounded by air. In another embodiment, prior to the exposure performed in block 63, the material 40 is exposed throughout to relatively low intensity light. This light has an intensity less than the light intensity in the region in which the conical beams of light overlap, but is sufficient to cause material 40 to solidify. After the exposure performed in block 63, region 50 is surrounded by solidified material 40 having a lower density and lower refractive index than material 40 in region 50.

In an embodiment, the light to which the material 40 is exposed in block 63 is generated by two independent light sources (not shown) that generate light of different wavelengths. Using light of different wavelengths ensures that the entire region 50 of the material 40 will be exposed to a high light intensity because the conical beams of light emitted from the ends of fibers 20 and 30 will not destructively interfere in the region 50. In other embodiments, a single source is used in conjunction with an optical splitter to generate light of the same wavelength. Using light of the same wavelength in both conical beams leads to the possibility that destructive interference will occur in the region 50. Such interference may prevent a uniformly high light intensity from occurring in region 50. Interference can be avoided by using incoherent light i.e., light whose phase is not stable and that have no continuity to the phase. As long as the light is incoherent, then it can be assured that destructive interference will not occur in the region 50.

The determination as to whether sufficient exposure has occurred in waveguide region 50 (decision block 64) may be made by projecting light down one of the fibers and measuring the attenuation of the light propagating out of the far end of the other fiber. Once sufficient exposure has occurred, an optical path that prevents divergence of the light exists between the ends 22 and 32 of fibers 20 and 30, respectively. As stated above, the exposure time should be sufficiently long to ensure that the region 50 of the material 40 has fully undergone cross-linking, or has undergone substantially more cross-linking than the remainder of material 40. As indicated above, the remainder of material 40 outside region 50 of high-intensity exposure will have undergone less cross-linking, if any, than region 50. The remainder of material 40 can be removed later if desired. Over exposure of material 40 to light may result in material 40 having a uniform refractive index throughout, and the material will not properly guide the light between the WG cores 21 and 31 because light propagating through the material 40 will diverge.

In accordance with a second exemplary embodiment, the material 40 undergoes cross-linking by two-photon absorption. Two-photon absorption is used to activate chemical and physical processes with high spatial resolution in three dimensions. Currently, two-photon absorption is used for optical data storage, three-dimensional (3-D) fluorescence imaging, and lithographic fabrication. With two-photon absorption, the cross-linking is a nonlinear function (i.e., quadratic) of the intensity of the light to which the material is exposed to promote cross-linking. The same materials that undergo cross-linking by one-photon absorption can undergo cross-linking by two-photon absorption. Therefore, the above-described materials that undergo cross-linking by one-photon absorption can be used in this embodiment.

Two-photon absorption occurs when two photons are simultaneously absorbed by a molecule of the UV initiator in the region 50 during exposure. With two-photon absorption, the conical beams of light emitted from the ends of the fibers 20 and 30 may be of the same or different wavelengths. To obtain two-photon absorption during the exposure process of block 63, the illumination intensity greater than a threshold intensity is needed in the region in which the conical beams overlap. With two-photon absorption, problems due to over-exposure are less likely to occur than with one-photon absorption. However, light from relatively high power lasers generally is needed to produce two-photon absorption. The high power lasers required to produce two-photon absorption has, to date, made the widespread use of two-photon absorption in photopolymers impractical. However, materials have recently been introduced that do not require high power lasers to produce two-photon absorption. For example, the compound 4,4'-bis (N,N-di-n-butylamino)-E-stilbene is a suitable material for this purpose. Two commercially-available acrylates, SR9008 and SR454 sold by Sartomer Co. of Exton, Pa. are also suitable for this purpose.

It should be noted that, while the present invention has been described with respect to certain exemplary embodiments, the present invention is not limited to these embodiments. Modifications can be made to the embodiments described above and all such modifications are within the scope of the present invention. For example, although the present invention has been discussed primarily with reference to optical fibers, the present invention applies equally to other types of optical waveguides.

We claim:

1. An optical waveguide device, comprising:
    a first optical waveguide having a first end;
    a second optical waveguide having a first end, the first ends of the first and second optical waveguides being separated by a gap; and an optical coupler extending across the gap between the first ends of the first and second optical waveguides, the optical coupler comprising a waveguide region and a region surrounding the waveguide region, the waveguide region having a first refractive index and a shape that diverges from the first end of each of the first and second optical waveguides as defined by overlapping cones of light emitted from the first ends of the first and second optical waveguides into the optical coupler, the first refractive index having been increased by exposure to the overlapping cones of light and the region surrounding the waveguide region having a second refractive index different from the first refractive index.

2. The optical waveguide device of claim 1, wherein the waveguide region comprises a material that has a refractive index capable of being increased by exposing the material to light of a particular wavelength or wavelength band.

3. The optical waveguide device of claim 2, wherein exposing the material to the light of a particular wavelength or wavelength band causes the material to undergo cross-linking.

4. The optical waveguide device of claim 1, wherein the first and second optical waveguides each comprise an optical fiber.

5. An optical waveguide device, comprising:
a first optical waveguide having a first end;
a second optical waveguide having a first end, the first ends of the waveguides being separated by a gap; and
an optical coupler extending across the gap between the first ends of the waveguides, the optical coupler comprising material including a waveguide region, the waveguide region having a shape defined by overlapping cones of light emitted from the first ends of the optical waveguides into the material,
wherein the material has a refractive index capable of being increased by exposing the material to light of a particular wavelength or wavelength band, wherein exposing the material to the light of a particular wavelength or wavelength band causes the material to undergo cross-linking, and wherein the material undergoes cross-linking by one of one-photon absorption and two-photon absorption.

6. An optical waveguide device, comprising:
a first optical waveguide having a first end;
a second optical waveguide having a first end, the first ends of the waveguides being separated by a gap; and
an optical coupler extending across the gap between the first ends of the waveguides, the optical coupler comprising material including a waveguide region, the waveguide region having a shape defined by overlapping cones of light emitted from the first ends of the optical waveguides into the material, an index of refraction of the waveguide region having been increased by exposure to the overlapping cones of light wherein:
the first and second optical waveguides each comprise a core surrounded by a cladding, the cladding having an index of refraction; and
in the waveguide region, the material has the refractive index greater than the refractive index of the cladding of the optical waveguides.

7. An optical waveguide device, comprising:
a first optical waveguide having a first end;
a second optical waveguide having a first end, the first ends of the waveguides being separated by a gap; and
an optical coupler extending across the gap between the first ends of the waveguides, the optical coupler comprising material including a waveguide region, the waveguide region having a shape defined by overlapping cones of light emitted from the first ends of the optical waveguides into the material, an index of refraction of the waveguide region having been increased by exposure to the overlapping cones of light wherein:
the first optical waveguide comprises a first waveguide core and first cladding region, the first cladding region surrounding the first waveguide core, the first waveguide core and the first cladding region having respective refractive indices, the refractive index of the first cladding region being lower than the refractive index of the first waveguide core;
the second optical waveguide comprises a second waveguide core and second cladding region, the second cladding region surrounding the second waveguide core, the second waveguide core and the second cladding region having respective refractive indices, the refractive index of the second cladding region being lower than the refractive index of the second waveguide core; and
the waveguide region of the material has the refractive index greater than the refractive indices of the first and second cladding regions.

8. An optical waveguide device, comprising:
a first optical waveguide having a first end;
a second optical waveguide having a first end, the first ends of the waveguides being separated by a gap; and
an optical coupler extending across the gap between the first ends of the waveguides, the optical coupler comprising material including a waveguide region, the waveguide region having a shape defined by overlapping cones of light emitted from the first ends of the optical waveguides into the material, wherein:
the material included in the waveguide region has a first refractive index having been increased by exposure to the overlapping cones of light; and
the waveguide region is surrounded by one of a solid form of the material having a refractive index less than the first refractive index, and a liquid form of the material having a refractive index less than the first refractive index.

9. A method for aligning optical waveguides, the method comprising:
providing a first optical waveguide and a second optical waveguide;
axially aligning the first and second optical waveguides leaving a gap between adjacent ends of the aligned waveguides;
filling the gap with a material having a refractive index capable of being increased by exposing the material to light; and
exposing the material to overlapping conical beams of light emitted from the adjacent ends of the first and second optical waveguides to define a waveguide region in the material having a refractive index and a shape that diverges from the adjacent ends of each of the first and second optical waveguides as defined by the overlapping conical beams of light, the exposing increasing the refractive index of the material in the waveguide region to provide the waveguide region with a refractive index that differs from a refractive index of a region surrounding the waveguide region.

10. The method of claim 9, wherein the exposing comprises propagating incoherent light of the same wavelength through both optical waveguides.

11. The method of claim 9, wherein the exposing comprises propagating light of a different wavelength through each of the optical waveguides.

12. The method of claim 9, wherein the exposing increases the refractive index of the material by causing the material to undergo cross-linking.

13. The method of claim 9, wherein the first and second optical waveguides each comprise an optical fiber.

14. A method for aligning optical waveguides, the method comprising:
   providing a first optical waveguide and a second optical waveguide;
   axially aligning the first and second optical waveguides leaving a gap between adjacent ends of the aligned waveguides;
   filling the gap with a material having a refractive index capable of being increased by exposing the material to light;
   exposing the material to conical beams of light emitted from the adjacent ends of the waveguides, the exposing increasing the refractive index of the material in a region in which the beams of light overlap; and
   uniformly exposing the material to light of an intensity less than the intensity in the region.

15. A method for aligning optical waveguides, the method comprising:
   providing a first optical waveguide and a second optical waveguide;
   axially aligning the first and second optical waveguides leaving a gap between adjacent ends of the aligned waveguides;
   filling the gap with a material having a refractive index capable of being increased by exposing the material to light; and
   exposing the material to conical beams of light emitted from the adjacent ends of the waveguides, the exposing increasing the refractive index of the material in a region in which the beams of light overlap,
      wherein the exposing increases the refractive index of the material by causing the material to undergo cross-linking, and wherein the cross-linking is the result of one of one-photon absorption and two-photon absorption.

* * * * *